United States Patent
Ardanese et al.

(10) Patent No.: US 11,302,941 B2
(45) Date of Patent: Apr. 12, 2022

(54) AUTOMATED MOBILE COMPRESSED HYDROGEN FUEL SOURCE MANAGEMENT FOR MOBILE POWER GENERATION APPLICATIONS

(71) Applicant: GM GLOBAL TECHNOLOGY OPERATIONS LLC, Detroit, MI (US)

(72) Inventors: Raffaello Ardanese, Bloomfield Hills, MI (US); Kristopher A. Thor, West Bloomfield, MI (US); Amber T. Vanness, Dimondale, MI (US); Mark A. Leavitt, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 16/742,218

(22) Filed: Jan. 14, 2020

(65) Prior Publication Data

US 2021/0218043 A1 Jul. 15, 2021

(51) Int. Cl.
*H01M 8/0438* (2016.01)
*H01M 8/04082* (2016.01)
*H01M 8/04746* (2016.01)
*F16K 21/04* (2006.01)
*F16K 37/00* (2006.01)
*G05D 7/01* (2006.01)

(52) U.S. Cl.
CPC ......... *H01M 8/04388* (2013.01); *F16K 21/04* (2013.01); *F16K 37/005* (2013.01); *G05D 7/01* (2013.01); *H01M 8/04201* (2013.01); *H01M 8/04753* (2013.01); *H01M 2250/10* (2013.01)

(58) Field of Classification Search
CPC ................................................. H01M 8/04388
See application file for complete search history.

(56) References Cited

U.S. PATENT DOCUMENTS

| | | | |
|---|---|---|---|
| 2004/0121218 A1* | 6/2004 | Andrews ........... | H01M 8/04179 429/413 |
| 2005/0077252 A1* | 4/2005 | Shih .................. | H01M 8/04044 210/767 |
| 2008/0250804 A1* | 10/2008 | Kubo ................ | H01M 8/04208 62/241 |
| 2009/0214900 A1* | 8/2009 | Hoffjann ........... | H01M 8/04156 429/413 |
| 2013/0149620 A1* | 6/2013 | Fabian .............. | H01M 8/04373 429/416 |

* cited by examiner

*Primary Examiner* — Brian R Ohara
(74) *Attorney, Agent, or Firm* — Quinn IP Law (57) ABSTRACT

A pressure-based latching switch includes a shuttle valve, a first valve and a second valve. The shuttle valve may switch a fuel through one of a first port and a second port in response to a greater pressure of the fuel at the ports. The first valve may switch a fuel to the first port while a second pressure of the fuel at the second port is less than a second threshold pressure. The second valve may switch the fuel to the second port while a first pressure of the fuel at the first port is less than a first threshold pressure. The pressure-based latching switch may change the fuel supplied to the fuel cell system automatically from a first fuel tank to a second fuel tank in response to the first pressure of the fuel falling below the first threshold pressure.

20 Claims, 7 Drawing Sheets

AUTOMATED MOBILE COMPRESSED HYDROGEN FUEL SOURCE MANAGEMENT FOR MOBILE POWER GENERATION APPLICATIONS

INTRODUCTION

The present disclosure relates to a system and a method for automated mobile compressed hydrogen fuel source switching management for power generation applications.

Owners of battery electric vehicles who want to recharge their vehicles during long trips desire recharging at inter-city locations. Presently, permanent charging stations involve local investment for infrastructure to install. If a location is chosen poorly, the investment may be wasted. Existing mobile fuel-cell-based power generators can be placed at strategic locations before the permanent charging stations are available.

However, the existing mobile fuel-cell-based power generators do not allow for continuous operation. Laborious manual operations and existing swapping procedures for fuel tanks can interrupt the hydrogen fuel supply that feeds individual fuel-cell-based power generators. The swapping can also occur at inconvenient times, such as during peak charging demands and during bad weather. What is desired is a technique for automating mobile compressed hydrogen fuel source refueling management of the fuel-cell-based power generators.

SUMMARY

A pressure-based latching switch is provided herein. The pressure-based latching switch includes a shuttle valve, a first valve and a second valve. The shuttle valve is connectable to a fuel cell system, wherein the shuttle valve has a first port configured to receive a fuel from a first fuel tank, has a second port configured to receive the fuel from a second fuel tank, and is configured to switch the fuel supplied to the fuel cell system through one of the first port and the second port in response to a greater pressure of the fuel at the first port or the second port. The first valve is in communication with the shuttle valve, and is configured to switch the fuel from the first fuel tank to the first port of the shuttle valve while a second pressure of the fuel at the second port of the shuttle valve is less than a second threshold pressure. The second valve is in communication with the shuttle valve, and is configured to switch the fuel from the second fuel tank to the second port of the shuttle valve while a first pressure of the fuel at the first port of the shuttle valve is less than a first threshold pressure. The pressure-based latching switch changes the fuel supplied to the fuel cell system automatically from the first fuel tank to the second fuel tank in response to the first pressure of the fuel from the first fuel tank falling below the first threshold pressure.

In one or more embodiments of the pressure-based latching switch, the fuel comprises compressed hydrogen, the first fuel tank comprises a first hydrogen tank that is portable, and the second fuel tank comprises a second hydrogen tank that is portable.

In one or more embodiments of the pressure-based latching switch, the pressure-based latching switch further changes the fuel supplied to the fuel cell system automatically from the second fuel tank to the first fuel tank in response to the second pressure of the fuel falling below the second threshold pressure.

In one or more embodiments of the pressure-based latching switch, the fuel is further supplied continuously to the fuel cell system while at least one of: the first fuel tank is connected to the pressure-based latching switch and is pressurized to a first minimum pressure greater than the first threshold pressure; and the second fuel tank is connected to the pressure-based latching switch and is pressurized to a second minimum pressure greater than the second threshold pressure.

In one or more embodiments, the pressure-based latching switch further comprises a third valve configured to depressurize the fuel at the first port of the shuttle valve in response to the second pressure at the second port of the shuttle valve rising above a third threshold pressure; and a fourth valve configured to depressurize the fuel at the second port of the shuttle valve in response to the first pressure at the first port of the shuttle valve rising above a fourth threshold pressure, wherein the third threshold pressure is different than the fourth threshold pressure.

In one or more embodiments of the pressure-based latching switch, the first threshold pressure is based on a first technology of the first fuel tank; the second threshold pressure is based on a second technology of the second fuel tank; and the first threshold pressure is different than the second threshold pressure.

In one or more embodiments of the pressure-based latching switch, the first threshold pressure is less than a minimum pressure of the fuel from the first fuel tank suitable to safely shut down the fuel cell system.

In one or more embodiments, the pressure-based latching switch further comprises a controller configured to generate a warning message in response to an output pressure of the fuel supplied to the fuel cell system falling below a first warning pressure.

In one or more embodiments of the pressure-based latching switch, the fuel cell system converts the fuel into electricity suitable to recharge a vehicle.

A method for pressure-based latching switching is provided herein. The method may comprise: switching a fuel from a first fuel tank to a first port of a shuttle valve while a second pressure of the fuel at a second port of the shuttle valve is less than a second threshold pressure; switching the fuel from a second fuel tank to the second port of the shuttle valve while a first pressure of the fuel at the first port of the shuttle valve is less than a first threshold pressure; switching the fuel supplied to a fuel cell system through one of the first port of the shuttle valve and the second port of the shuttle valve in response to a greater pressure of the fuel at the first port or the second port; and changing the fuel supplied to the fuel cell system automatically from the first fuel tank to the second fuel tank in response to the first pressure of the fuel falling below the first threshold pressure.

In one or more embodiments of the method, the fuel comprises compressed hydrogen, the first fuel tank comprises a first hydrogen tank that is portable, and the second fuel tank comprises a second hydrogen tank that is portable.

In one or more embodiments, the method further comprises changing the fuel supplied to the fuel cell system automatically from the second fuel tank to the first fuel tank in response to the second pressure of the fuel falling below the second threshold pressure.

In one or more embodiments of the method, the fuel is further supplied continuously to the fuel cell system while at least one of: the first fuel tank is connected to the shuttle valve and is pressurized to a first minimum pressure greater than the first threshold pressure; and the second fuel tank is connected to the pressure-based latching switch and is pressurized to a second minimum pressure greater than the second threshold pressure.

In one or more embodiments, the method further comprises: depressurizing the fuel at the first port of the shuttle valve in response to the second pressure at the second port of the shuttle valve rising above a third threshold pressure; and depressurizing the fuel at the second port of the shuttle valve in response to the first pressure at the first port of the shuttle valve rising above a fourth threshold pressure, wherein the third threshold pressure is different than the fourth threshold pressure.

A mobile power generator is provided herein. The power generator comprises a fuel cell system, a pressure-based latching switch and a controller. The fuel cell system is configured to convert a fuel into electricity suitable to recharge a vehicle. The pressure-based latching switch is connectable to a first fuel tank, connectable to a second fuel tank, in communication with the fuel cell system, and comprising a shuttle valve having a first port and a second port. The pressure-based latching switch is configured to: switch the fuel from the first fuel tank to the first port of the shuttle valve while a second pressure of the fuel at the second port of the shuttle valve is less than a second threshold pressure; switch the fuel from the second fuel tank to the second port of the shuttle valve while a first pressure of the fuel at the first port of the shuttle valve is less than a first threshold pressure; switch the fuel supplied to the fuel cell system through one of the first port of the shuttle valve and the second port of the shuttle valve in response to a greater pressure of the fuel at the first port or the second port; and change the fuel supplied to the fuel cell system automatically from the first fuel tank to the second fuel tank in response to the first pressure of the fuel falling below the first threshold pressure. The controller is configured to generate a message in response to an output pressure of the fuel supplied to the fuel cell system falling below a first warning pressure.

In one or more embodiments of the mobile power generator, the fuel comprises compressed hydrogen, the first fuel tank comprises a first hydrogen tank that is portable, and the second fuel tank comprises a second hydrogen tank that is portable.

In one or more embodiments of the mobile power generator, the message is a time remaining until the fuel supplied from the first mobile trailer to the fuel cell system reaches a second warning pressure; and the time remaining is sufficient to provide another hydrogen source before the second warning pressure is reached.

In one or more embodiments of the mobile power generator, the pressure-based latching switch is further configured to: depressurize the fuel at the first port of the shuttle valve in response to the second pressure at the second port of the shuttle valve rising above a third threshold pressure; and depressurize the fuel at the second port of the shuttle valve in response to the first pressure at the first port of the shuttle valve rising above a fourth threshold pressure, wherein the third threshold pressure is different than the fourth threshold pressure.

In one or more embodiments of the mobile power generator, the controller is further configured to initiate an automatic shutdown of the fuel cell system in response to the output pressure of the fuel supplied to the fuel cell system falling below a second warning pressure, and the second warning pressure is greater than the first threshold pressure.

In one or more embodiments of the mobile power generator, the fuel is provided continuously to the fuel cell system.

The above features and advantages and other features and advantages of the present disclosure are readily apparent from the following detailed description of the best modes for carrying out the disclosure when taken in connection with the accompanying drawings.

DETAILED DESCRIPTION

Various embodiments of the disclosure provide a mobile charging architecture that may provide continuous operation to recharge electric vehicles (e.g., battery electric vehicles and/or plugin hybrid vehicles). The mobile charging architecture may be used to create a fleet of mobile fuel-cell-based power generators that may be placed at locations remote from a stationary supply of a compressed hydrogen fuel. The mobile charging architecture may help reduce costs for electric vehicle (EV) charging infrastructure deployment and may increase efficiencies in the mobile fuel-cell-based power generators. The mobile fuel-cell-based power generators generally allow "scouting" of potential investment sites for permanent charger locations.

A device (e.g., a pressure-based latching switch) may implement a compressed hydrogen fuel source management technique in a mobile power generator that provides automatic switching of a hydrogen fuel supply between multiple (e.g., two) compressed sources (e.g., fuel tanks on mobile trailers) tethered to the mobile power generator. The compressed hydrogen fuel source management technique generally guarantees a constant fuel supply for a fuel cell system within the mobile power generator. The compressed hydrogen fuel source management technique may automatically switch from an active hydrogen fuel tank to an alternate fuel tank, when a fuel pressure reaches a setpoint, without interruption of power generation. The technique provides a portable solution to fuel the mobile power generators to allow continuous operation with minimal human interaction.

The technique generally allows automatic fuel tank switching at a remote site based on one or more pressure set points. When a first fuel tank is reaching a low pressure level, a second tank may be brought to the site and plugged into one of multiple receptacles of the device. The device generally coordinates between the two fuel tanks based on the fuel pressures. The device may automatically change the source of the fuel flowing to the fuel cell system from the first fuel tank to the second fuel tank to allow continuous operation of the mobile power generator. While the second fuel tank is supplying the fuel used to generate a high-voltage charging current, the empty first fuel tank may be disconnected and removed from the site.

When the second fuel tank is reaching a corresponding low pressure level, a new full fuel tank may be brought to the site and plugged into the unused receptacle of the device. The device may automatically change the source of the fuel flowing to the fuel cell system from the second fuel tank to the new fuel tank to allow continuous operation of the mobile power generator.

Another set of valves in the device may compensate for eventual temperature rise and corresponding pressure rise of low pressure fuel left in fuel lines associated with a disconnected fuel tank. The device generally allows a highest pressure fuel line to be selected to provide the fuel to the fuel cell system thereby avoiding unwanted pressure oscillation within the mobile power generator.

Figure 1:
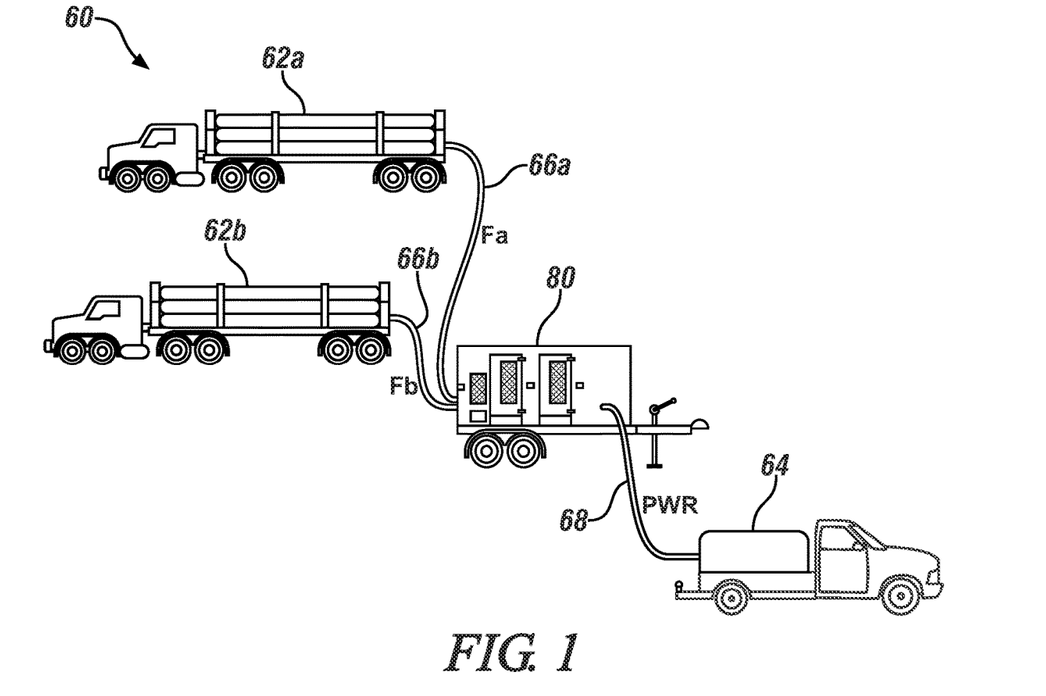
FIG. 1 is a schematic side view diagram illustrating a context of a system.

Referring to FIG. 1, a schematic side view diagram illustrating a context of a system 60 is shown. The system 60 may implement a mobile recharging system. The system 60 generally comprises multiple mobile trailers 62a-62b, a power generator 80 and one or more electric vehicles 64 (one shown). A first fuel hose 66a may be connectable between a first mobile trailer 62a and the power generator 80. A second fuel hose 66b may be connectable between a second mobile trailer 62b and the power generator 80. One or more power cables 68 (one shown) may be connectable between the power generator 80 and the one or more vehicle 64.

The first fuel hose 66a may carry a first fuel supply (e.g., Fa) from the first mobile trailer 62a to the power generator 80. The second fuel hose 66b may carry a second fuel supply (e.g., Fb) from the second mobile trailer 62b to the power generator 80. The power cables 68 may transfer an electrical power signal (e.g., PWR) from the power generator 80 to the vehicles 64.

The mobile trailers 62a-62b may implement hydrogen fuel supplies. The mobile trailers 62a-62b are generally operational to transport the fuel supplies Fa-Fb (e.g., the compressed hydrogen) from a fuel refilling station (or a reformer) to sites where the power generators 80 are positioned. In other embodiments, other types of fuels such as natural gas may be implemented to meet the design criteria of a particular application.

The vehicles 64 may implement battery electric vehicles and/or plugin hybrid vehicles. The vehicles 64 may include internal high-voltage batteries that drive electric motors to propel the vehicles 64. In various embodiments, the vehicles 64 may include, but are not limited to, passenger vehicles, trucks, autonomous vehicles, electric bicycles and the like.

The fuel hoses 66a-66b may implement compressed hydrogen fuel hoses. The fuel hoses 66a-66b are generally operational to convey the hydrogen fuel from the mobile trailers 62a-62b to the power generator 80. In various embodiments, the fuel hoses 66a-66b may be disconnectable at one end from the mobile trailers 62a-62b and disconnectable at the other end from the power generator 80.

The power cables 68 may implement recharging cables (or harnesses). The power cables 68 may be operational to carry the high-voltage electrical power signal PWR from the power generator 80 to the vehicles 64. The high-voltage electrical power may be used to rapidly recharge the high-voltage batteries within the vehicles 64. In various embodiments, the high-voltage electrical power signal PWR may range from approximately 300 volts direct current (Vdc) to approximately 1000 Vdc. Other high-voltage ranges may be implemented to meet the design criteria of a particular application.

The power generator 80 may implement a mobile DC recharging station (e.g., a Level 3 recharging station). In various embodiments, the power generator 80 may be a mobile fuel-cell-based power generator. The power generator 80 may be moveable to locations (or sites) of interest to establish an electric vehicle recharging location. In various embodiments, one or more power generators 80 may be moved to a common location to accommodate a large anticipated number of the electric vehicles 64. If the demand for recharging at the common location exceeds the capacity of the available power generators 80, more power generators 80 may be brought to the location. If the demand for recharging is less than anticipated, one or more of the power generators 80 may be relocated to other locations. The power generators 80 may implement a towable generator or a self-propelled generator (or vehicle).

Figure 2:
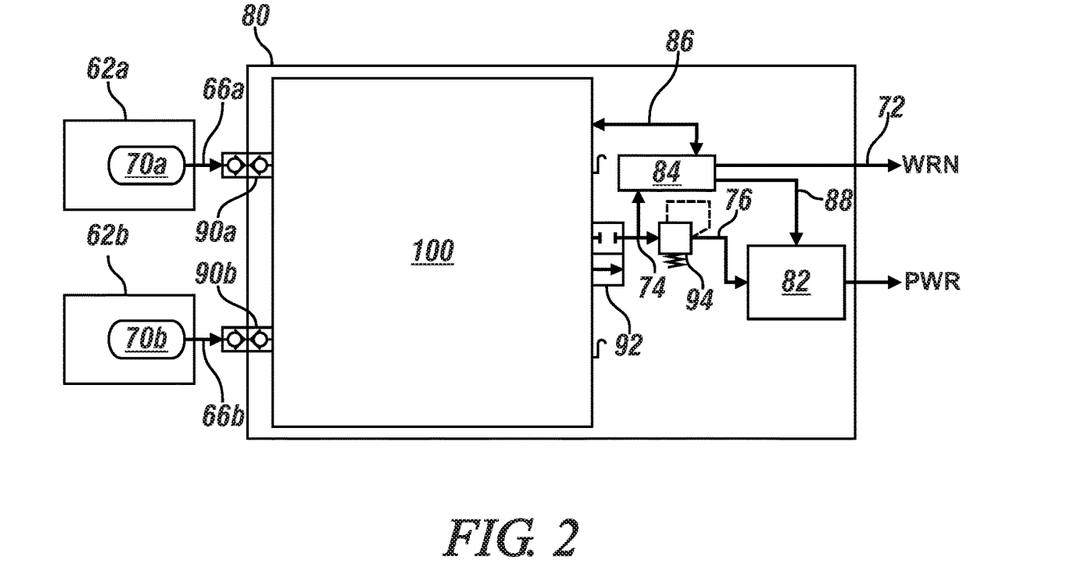
FIG. 2 is a schematic diagram of mobile trailers and a power generator in accordance with an exemplary embodiment.

Referring to FIG. 2, a schematic diagram of example implementations of the mobile trailers 62a-62b and the power generator 80 is shown in accordance with an exemplary embodiment. The first mobile trailer 62a generally comprises a first fuel tank 70a. The second mobile trailer 62b generally comprises a second fuel tank 70b. The power generator 80 generally comprises a fuel cell system 82, a controller 84, multiple receptacles 90a-90b, an on-tank valve 92, a gas handling unit 94 and a pressure-based latching switch 100.

The electrical power signal PWR may be generated and present by the fuel cell system 82. A warning signal (e.g., WRN) may be generated and present by the controller 84.

The first fuel hose 66a may be connected between the first fuel tank 70a and a first receptacle 90a. The second fuel hose 66b may be connected between the second fuel tank 70b and a second receptacle 90b. The power cables 68 may be connected to an output connector (e.g., socket) of the fuel cell system 82.

A carrier 72 may be generated by the controller 84 and presented from the power generator 80. The carrier 72 may convey the warning signal WRN. A first internal fuel line 74 may convey the fuel between the on-tank valve 92 and the gas handling unit 94. The first internal fuel line 74 may also be coupled to the controller 84 for sensing an output pressure of the fuel from the pressure-based latching switch 100. A second internal fuel line 76 may convey the fuel from the gas handling unit 94 to the fuel cell system 82. An optional control cable 86 may provide electrical communications between the controller 84 and the pressure-based latching switch 100. A communication bus 88 may provide digital communications between the controller 84 and the fuel cell system 82.

Individual ones of the fuel tanks 70a-70b may be implemented as one or more portable hydrogen fuel tanks configured to store the compressed hydrogen. In various embodiments, the fuel tanks 70a-70b may by Type IV tanks capable of storing the hydrogen at pressures of up to approximately 700 bars. Other types of portable tanks, other tank technologies and/or other capacities may be implemented to meet the design criteria of a particular application. A first capacity of, a first technology of and/or a first amount of fuel in the first fuel tank 70a may match a second capacity of, a second technology of and/or a second amount of fuel in the second fuel tank 70b. In some situations, the first capacity and the second capacity may be different, the first technology and the second technology may be different, and/or an amount of fuel loaded into the fuel tanks 70a-70b may be different.

The carrier 72 may be implemented as an optical carrier, an acoustic carrier and/or an electronic carrier. The warning signal WRN conveyed by the carrier 72 is generally operational to convey an amount of a cycle time remaining that the current fuel tank 70a or 70b may continuously power the fuel cell system 82. In some embodiments (e.g., optical and/or audio), the carrier 72 may be presented to a user (or person) in proximity to the power generator 80. In other embodiments (e.g., electrical), the carrier 72 may be a radio-frequency signal transmitted to the user at a distance location. The cycle time remaining for the current fuel tank 70a or 70b may be programmable based on one or more of the type of fuel tank 70a or 70b in use, a capacity of the current fuel tank 70a or 70b, a technology of the current fuel tank 70a or 70b and/or an amount of time/distance used to transfer the other fuel tank 70b or 70a from the refilling station for the hydrogen to the site of the power generator 80.

The fuel cell system 82 may be implemented as one or more fuel cell stacks. The fuel cell system 82 is generally operational to generate electrical power from the fuel received through the pressure-based latching switch 100 from the fuel tanks 70a-70b. The electrical power may be generated in a range of approximately 300 Vdc to approximately 1000 Vdc. The electrical power conveyed may range from approximately 100 kilowatts to approximately 750 kilowatts. Other ranges of electrical power may be implemented to meet the design criteria of a particular application.

The controller 84 may implement an electronic control unit. The controller 84 is generally operational to monitor the output pressure of the fuel in the first internal fuel line 74. The controller 84 may act when the output pressure reaches one or more threshold pressures (or levels).

The controller 84 may generate the warning signal WRN in response to the output pressure reaching a first warning pressure. The controller 84 may be programmable with multiple parameters used to calculate the cycle time remaining that the current fuel tank 70a or 70b may supply the fuel cell system 82. The parameters may include, but are not limited to, the type of fuel tanks 70a-70b in use, the capacities of the fuel tanks 70a-70b, technologies of the fuel tanks 70a-70b, the amount of power being generated by the power generator 80, a distance that the mobile trailers 62a-62b travel from where the fuel tanks 70a-70b are refilled to the site where the power generator 80 is located, a time to travel the distance and/or an amount of time suitable to shut down the fuel cell system 82.

The controller 84 may initiate an automatic safe shut down of the fuel cell system 82 in response to the output pressure reaching a second warning pressure. A command for the automatic safe shutdown may be transferred to the fuel cell system 82 via the communication bus 88. The second warning pressure is generally at a lower pressure than the first warning pressure. The second warning pressure may be programmed into the controller 84 to provide adequate fuel to perform the shutdown while leaving at least a lowest specified amount of fuel in the current fuel tank 70a or 70b.

In various embodiments, the controller 84 may electronically control multiple valves and monitor the pressures of the fuel at various points within the pressure-based latching switch 100 to achieve the automatic switching between the fuel tanks 70a and 70b. The controlling and the monitoring may be accomplished through the control cable 86. Where the controller 84 implements the switching operations, the controller 84 may change the fuel flow from the fuel tanks 70a-70b in response to the fuel pressure falling below a switch point pressure. The switch point pressure may be programmed to leave at least the lowest specified amount of fuel in the current fuel tank 70a or 70b when switching over to the other fuel tank 70b or 70a. The fuel pressure may be monitored at the first internal fuel line 74 or at valve locations inside the pressure-based latching switch 100.

The gas handling unit 94 may implement a pressure regulator. The gas handling unit 94 is generally operational to provide a constant output pressure of the fuel presented to the fuel cell system 82 from a variable pressure fuel received from the pressure-based latching switch 100.

The pressure-based latching switch 100 may implement an automatic fuel switching device. The pressure-based latching switch 100 is generally operational to route the fuel from the fuel tanks 70a-70b, one tank at a time, to the fuel cell system 82. The source of the fuel may be switched automatically (e.g., without human intervention and with or without support from the controller 84) between the two fuel tanks 70a-70b such that the flow of fuel to the fuel cell system 82 is continuous. The continuous flow of the fuel generally allows for continuous operation of the fuel cell system 82. Automatic switching of the fuel tanks 70a-70b may be performed when the fuel pressure of the current fuel tank 70a or 70b reaches the switch point pressure. In various embodiments, the switch point pressure may be dependent on the type, technology and/or capacity of the current fuel tank 70a or 70b. For example, the switch point pressure of the first fuel tank 70a may be set at a first threshold pressure and the switch point pressure of the second fuel tank 70b may be set at a second threshold pressure. In situations where the specifications the first fuel tank 70a matches the specifications of the second fuel tank 70b, the first threshold pressure may match the second threshold pressure. In situations where the fuel tanks 70a-70b have different specifications, the first threshold pressure may be different than the second threshold pressure.

Figure 3:
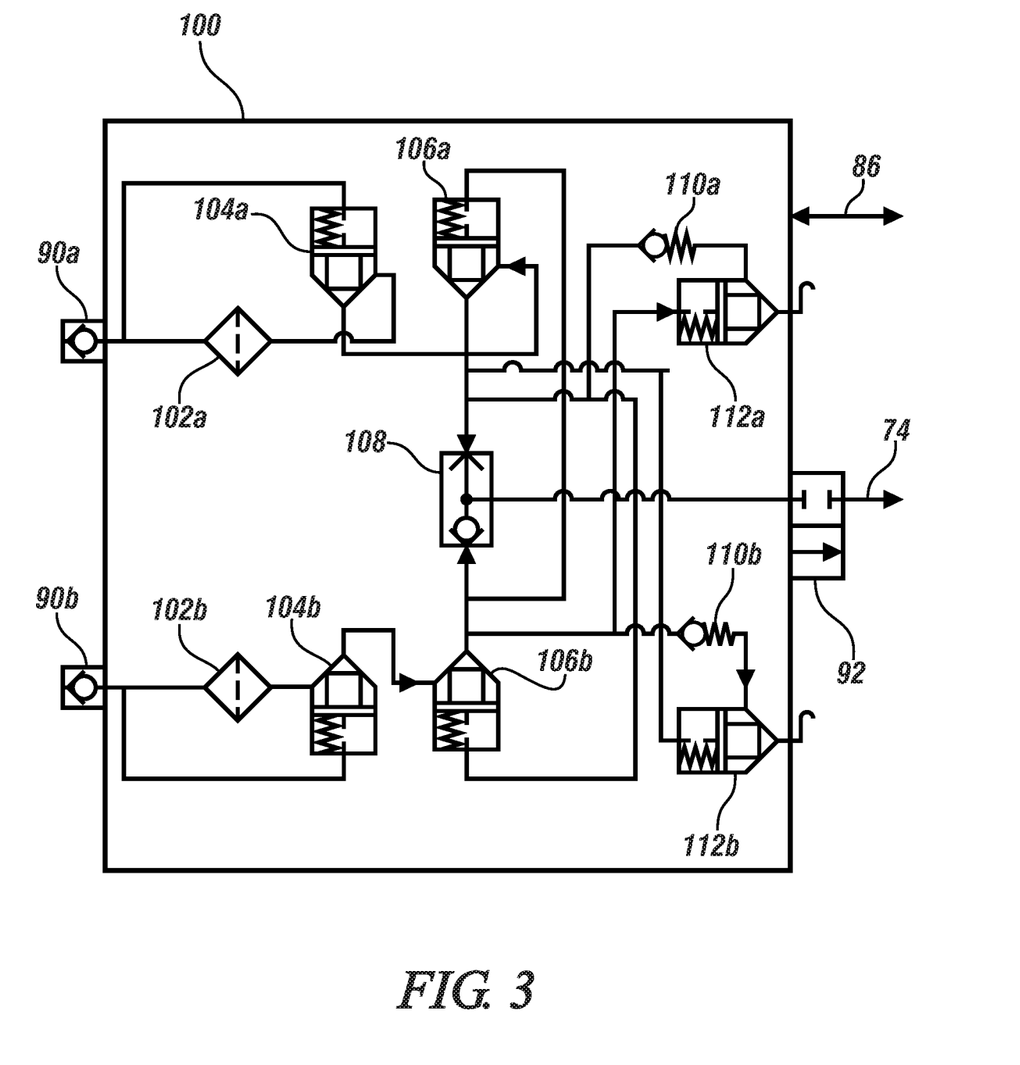
FIG. 3 is a schematic diagram of a pressure-based latching switch in accordance with an exemplary embodiment.

Referring to FIG. 3, a schematic diagram of an example implementation of the pressure-based latching switch 100 is shown in accordance with an exemplary embodiment. The pressure-based latching switch 100 generally comprises the on-tank valve 92, the receptacles 90a-90b, a shuttle valve 108, multiple check valves 110a-110b, multiple filters 102a-102b and multiple valves 104a-104b, 106a-106b and 112a-112b. In some embodiments, the pressure-based latching switch 100 may be connected to the control cable 86.

The filters 102a-102b may implement serviceable filters. The filters 102a-102b are generally operational to filter the incoming fuel from the fuel tanks 70a-70b. A first filter 102a may be in communication with the first receptacle 90a and an input port of a fifth valve 104a. A second filter 102b may be in communication with the second receptacle 90b and an input port of a sixth valve 104b.

The valves 104a-104b, 106a-106b and 112a-112b may implement pressure-activated valves. Individual ones of the valves 104a-104b, 106a-106b and 112a-112b may comprise an input port, an output port, and a control port. A pressure at a control port may determine if the valve between the input port and the output port is open or closed.

A first valve 106a may be in communication with the first receptacle 90a and a first port of the shuttle valve 108. The control port of the first valve 106a may be in communication with a second port of the shuttle valve 108. The first valve 106a may be open if the pressure at the second port of the shuttle valve 108 is less than a lowest specified pressure for the first fuel tank 70a (e.g., TANKAmin) plus an offset pressure (e.g., Xbar).

A second valve 106b may be in communication with the second receptacle 90b and the second port of the shuttle valve 108. The control port of the second valve 106b may be in communication with the first port of the shuttle valve 108. The second valve 106b may be open if the pressure at the first port of the shuttle valve 108 is less than a lowest specified pressure for the second fuel tank 70b (e.g., TANKBmin) plus the offset pressure Xbar.

A third valve 112a may be in communication with a first check valve 110a and the atmosphere. The control port of the third valve 112a may be in communication with the second port of the shuttle valve 108. The third valve 112a may be open if the pressure at the control port (e.g., same as the second port of the shuttle valve 108) is greater than a third threshold pressure. The third threshold pressure may be in a range of 3 bars to 7 bars (e.g., 5 bars). The third valve 112a is generally operational to depressurize the fuel in the fuel line connected between the first valve 106a and the shuttle valve 108.

A fourth valve 112b may be in communication with a second check valve 110a and the atmosphere. The control port of the fourth valve 112b may be in communication with the first port of the shuttle valve 108. The fourth valve 112b may be open if the pressure at the control port (e.g., same as the first port of the shuttle valve 108) is greater than a fourth threshold pressure. The fourth threshold pressure may be in a range of 2 bars to 6 bars (e.g., 4 bars). In various embodiments, the fourth threshold pressure may be less than the third threshold pressure. In other embodiments, the fourth threshold pressure may be greater than the third threshold pressure. The fourth valve 112b is generally operational to depressurize the fuel in the fuel line connected between the second valve 106b and the shuttle valve 108.

A fifth valve 104a may be in communication with the first filter 102a and the first valve 106a. The control port of the fifth valve 104a may be in communication with the first receptacle 90a. The fifth valve 104a may be open while the pressure at the control port is greater than the lowest pressure specified for the first fuel tank 70a. The fifth valve 104a is generally operational to present a closed valve looking into the first receptacle 90a unless the first fuel tank 70a is connected and is providing compressed fuel into the first receptacle 90a.

A sixth valve 104b may be in communication with the second filter 102b and the second valve 106b. The control port of the sixth valve 104b may be in communication with the second receptacle 90b. The sixth valve 104b may be open while the pressure at the control port is greater than the lowest pressure specified for the second fuel tank 70b. The sixth valve 104b is generally operational to present a closed valve looking into the second receptacle 90b unless the second fuel tank 70b is connected and is providing compressed fuel into the second receptacle 90b.

The shuttle valve 108 generally has the first port (e.g., A), the second port (e.g., B) and a third port. The first port A may be connected to the first valve 106a to receive the fuel from the first fuel tank 70a. The second port B may be connected to the second valve 106b to receive the fuel from the second fuel tank 70b. The third port may be connected to the on-tank valve 92. The shuttle valve 108 is generally operational to route the fuel to the on-tank valve 92 (and subsequently to the fuel cell system 82) from one of the ports A or B at a time. The active port A or B may be the port with the higher fuel pressure.

If compressed fuel is applied to both receptacles 90a-90b simultaneously, the valves 104a-104b may allow the compressed fuel to reach the valves 106a-106b. Since both ports A and B of the shuttle valve 108 are initially at low pressure, the valves 106a-106b may allow the compressed fuel to pass to the shuttle valve 108. Likewise, the initial low pressure at the ports A and B of the shuttle valve 108 may cause the valves 112a-112b to be closed.

As the fuel pressure rises at the ports A and B of the shuttle valve 108, the pressure at the control port of the fourth valve 112b may cause the fourth valve 112b to open. The open fourth valve 112b may vent the fuel at the second port B of the shuttle valve to the outside. The open fourth valve 112b may prevent the pressure at the second port B of the shuttle valve 108 from controlling the third valve 112a to the open state (or condition).

As the fuel pressure at the first port A of the shuttle valve continues to rise, the increasing pressure may control the second valve 106b to close. With the first valve 106a open and the second valve 106b closed, the shuttle valve 108 may open the first port A and close the second port B. The open first port A generally allows the fuel to be supplied through the on-tank valve 92, through the gas handling unit 94 and to the fuel cell system 82.

If compressed fuel is applied to the first receptacle 90a before the second receptacle, the fifth valve 104a may allow the compressed fuel to reach the first valve 106a. Since both ports A and B of the shuttle valve 108 are initially at low pressure, the first valves 106a may be open and allow the compressed fuel to pass to the shuttle valve 108. As the fuel pressure rises at the port A of the shuttle valve 108, the pressure at the control port of the second valve 106b may cause the second valve 106b to close. The closed second valve 106b generally prevents the compressed fuel, once available, from the second fuel tank 70b from reaching the shuttle valve 108. Therefore, the pressure-based latching switch 100 latches to supply the fuel from the first fuel tank 70a to the fuel cell system 82.

Once the fuel pressure in the first fuel tank 70a falls below the first threshold pressure, the low pressure at the control port of the second valve 106b may cause the second valve 106b to open. The open second valve 106b provides the compressed fuel from the second fuel tank 70b to the second port B of the shuttle valve 108. The higher pressure from the filled second fuel tank 70b generally exceeds the pressure from the nearly-empty first fuel tank 70a and so the shuttle valve 108 closes the first port A and opens the second port B. Therefore, the pressure-based latching switch 100 latches to supply the fuel from the second fuel tank 70b to the fuel cell system 82.

While the fuel cell system 82 is receiving the fuel from the first fuel tank 70a, the fuel pressure and thus the fuel temperature decreases. Once the pressure-based latching switch 100 changes the fuel source to the second fuel tank 70b, the cold fuel between the first valve 106a and the shuttle valve 108 is trapped and begins to warm. As the trapped fuel warms, the fuel temperature and the fuel pressure increase. To avoid the increasing fuel pressure from closing the currently-open second valve 106b, the third valve 112a may be opened to vent the trapped fuel to the atmosphere.

Figure 4:
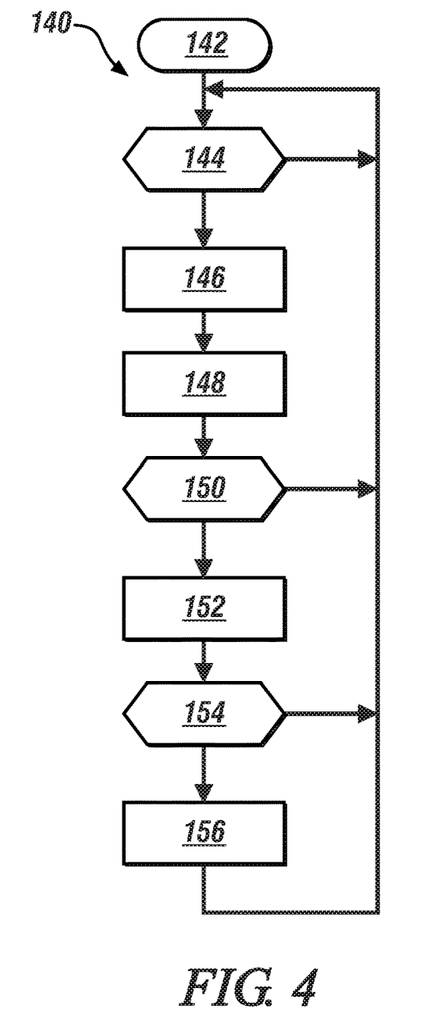
FIG. 4 is a flow diagram of a method for pressurizing fuel lines in accordance with an exemplary embodiment.

Referring to FIG. 4, a flow diagram of an example method 140 for pressurizing the fuel lines is shown in accordance with an exemplary embodiment. The method (or process) 140 may be implemented by the pressure-based latching switch 100 and optionally by the controller 84. The method 140 generally comprises a step 142, a decision step 144, a step 146, a step 148, a decision step 150, a step 152, a decision step 154 and a step 156. The sequence of steps is shown as a representative example. Other step orders may be implemented to meet the criteria of a particular application.

The method 140 is generally described based on the first fuel tank 70a containing compressed fuel. The method 140 may be repeated for the second fuel tank 70b containing compressed fuel. The method 140 generally begins with an initial unpressurized condition in the step 142. In the decision step 144, a check for compressed fuel from the first fuel tank 70a is performed by the fifth valve 104a. If no compressed fuel is available, the fifth valve 104a remains closed, and the method 140 may wait until the compressed fuel is available at the first receptacle 90a.

In the step 146, the first filter 102a may filter the fuel flowing into the power generator 80. The fifth valve 104a may determine if the fuel pressure is above the lowest specified pressure for the first fuel tank 70a in the decision step 150. If the fuel pressure is below the lowest specified pressure, the fifth valve 104a may remain closed and the method 140 returns to waiting.

Once the fuel pressure at the control port of the fifth valve 104a is above the lowest specified pressure, the fifth valve 104a may open in the step 152. The open fifth valve 104a generally allows the pressurized fuel to flow to the first valve 106a. In the decision step 154, if the pressure at the control port of the first valve 106a (same as the pressure at the second port B of the shuttle valve 108) is below the first threshold pressure (e.g., the switch point pressure for the first fuel tank 70a), the first valve 106a may remain closed and the method 140 continues to wait.

After the pressure at the control port of the first valve 106a is above the first threshold pressure, the first valve 106a may open in the step 156. The open first valve 106a generally routes the compressed fuel to the shuttle valve 108. The method 140 may loop back to the decision step 144 to verify that adequate fuel pressure remains at the first receptacle 90a. The loop in the method 140 may continue until insufficient fuel pressure is detected in the decision step 150 and the fifth valve 104a closes.

Figure 5:
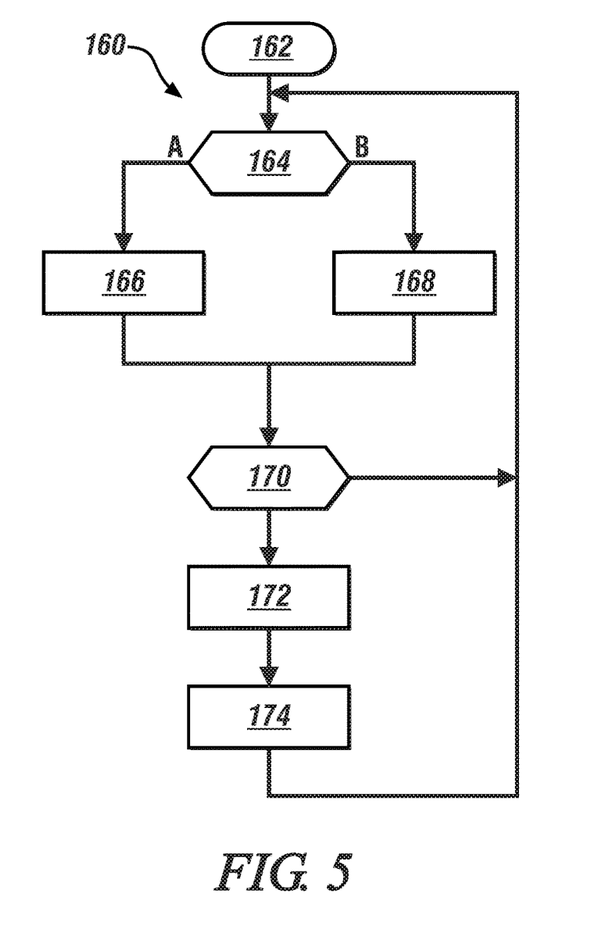
FIG. 5 is a flow diagram of a method for routing fuel to a fuel cell system in accordance with an exemplary embodiment.

Referring to FIG. 5, a flow diagram of an example method 160 for routing the fuel to the fuel cell system 82 is shown in accordance with an exemplary embodiment. The method (or process) 160 may be performed by the pressure-based latching switch 100 and optionally by the controller 84. The method 160 generally comprises a step 162, a decision step 164, a step 166, a step 168, a decision step 170, a step 172 and a step 174. Other step orders may be implemented to meet the criteria of a particular application.

The method 160 may begin in the step 162 with pressurized fuel available at the first port A and/or the second port B of the shuttle valve 108. The shuttle valve 108 may determine in the decision step 164 which port A or B has the greater pressure. If port A has a greater fuel pressure than port B, the shuttle valve 108 may open port A and close port B in the step 166. If the fuel pressure at port B is greater than at port A, the shuttle valve 108 may open port B and close port A in the step 168.

If the on-tank valve 92 is closed per the decision step 170, the method 160 may return to the decision step 162 to wait for the on-tank valve 92 to be opened and/or the pressures at ports A and B to change. After the on-tank valve 92 is open, the gas handling unit 94 may reduce the pressure of the fuel in the step 172 to a specified level suitable for the fuel cell system 82. The second internal fuel line 76 may transfer the fuel from the gas handling unit 94 to the fuel cell system 82 in the step 174. The method 160 may subsequently return to the decision step 164 to recheck the fuel pressures at the ports A and B.

Figure 6:
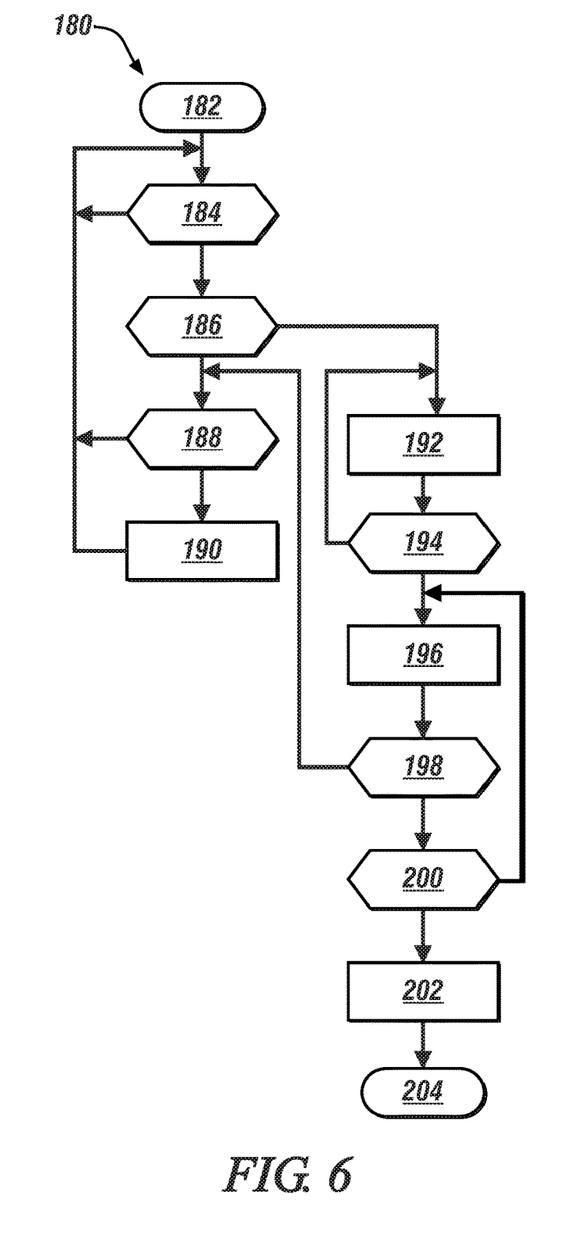
FIG. 6 is a flow diagram of a method for switching between fuel tanks in accordance with an exemplary embodiment.

Referring to FIG. 6, a flow diagram of an example method 180 for switching the fuel tanks is shown in accordance with an exemplary embodiment. The method (or process) 180 may be implemented by the system 60. The method 180 generally comprises a step 182, a decision step 184, a decision step 186, a decision step 188, a step 190, a step 192, a decision step 194, a step 196, a decision step 198, a decision step 200, a step 202 and a step 204. Other step orders may be implemented to meet the criteria of a particular application.

In the initial step 182, the fuel may be flowing from one of the fuel tanks 70a or 70b (e.g., the first fuel tank 70a) through the pressure-based latching switch 100 to the fuel cell system 82. The pressure-based latching switch 100 may monitor the pressure of the fuel in the decision step 184. If the fuel pressure is greater than the first warning pressure, the method 180 may continue to monitor the fuel pressure in the step 184. After the fuel pressure falls to or below the first warning pressure, if the other fuel tank 70a-70b (e.g., the second fuel tank 70b) is already connected to the pressure-based latching switch 100, the fuel pressure monitoring may continue through the decision step 186 to the decision step 188.

If the fuel pressure is above the switch point pressure, the decision step 188 may return the method 180 to the decision step 184 to continue monitoring the pressure of the fuel being conveyed to the fuel cell system 82. When the fuel pressure falls to or below the switch point pressure, the method may continue with the step 190. In the step 190, the pressure-based latching switch 100 may automatically change the fuel source from the current first fuel tank 70a to the other second fuel tank 70b. The method 180 may return to the decision step 184 to continue checking the fuel pressure.

In various embodiments, if the second fuel tank 70b is not connected to the power generator 80 at the decision step 186, the controller 84 may assert the warning signal WRN in the step 192. In other embodiments, the controller 84 may assert the warning signal WRN in response to the fuel pressure reaching the first warning pressure in the decision step 184 regardless of the presence or absence of the second fuel tank 70b. The warning signal WRN may notify an operator of the power generator 80 how much cycle time remains that the first fuel tank 70a may supply the fuel to the fuel cell system 82 before an automatic shutdown of the fuel cell system 82 is initiated. An optional check may be performed in the decision step 194 to determine if the fuel pressure falls to or below an intermediate warning pressure. If the fuel pressure is still above the intermediate warning pressure, the method 180 may return to the step 192 and continue to assert the warning signal WRN.

Once the fuel pressure reaches or falls below the intermediate warning pressure per the decision step 194, the controller 84 may start the cycle timer (if not previously started in the step 192) in the step 196 to indicate the time remaining until an automatic shutdown of the fuel cell system 82 is initiated. If the cycle timer was started in the step 192 when the warning signal WRN was asserted, the step 196 may adjust the cycle time remaining to an appropriate amount of time to perform the shutdown of the fuel cell system 82. If the second fuel tank 70b is connected to the pressure-based latching switch 100 during the countdown to, but before the automatic shutdown is initiated, the decision step 198 may adjust the method 180 to the decision step 188 (or 190). In the step 190, the pressure-based latching switch 100 may switch from the nearly depleted first fuel tank 70a to the full second fuel tank 70b and the operation of the fuel cell system 82 may continue uninterrupted. If the second fuel tank 70b is not connected to the pressure-based latching switch 100, monitoring of the fuel pressure and updating of remaining time may continue around the decision step 200, the step 196 and the decision step 198.

If fuel from the second fuel tank 70b is not available to the power generator 80 by the time the fuel pressure reaches the second warning pressure (e.g., a safe shutdown pressure) and/or the shutdown timer expires per the decision step 202, the controller 84 may command the fuel cell system 82 to perform an automatic safe shutdown in the step 202. In response to the fuel cell system 82 completing the shutdown, the method 180 may stop in the step 204 and wait for the operator to provide a source of the fuel to bring the fuel cell system 82 back into an operational state.

Figure 7:
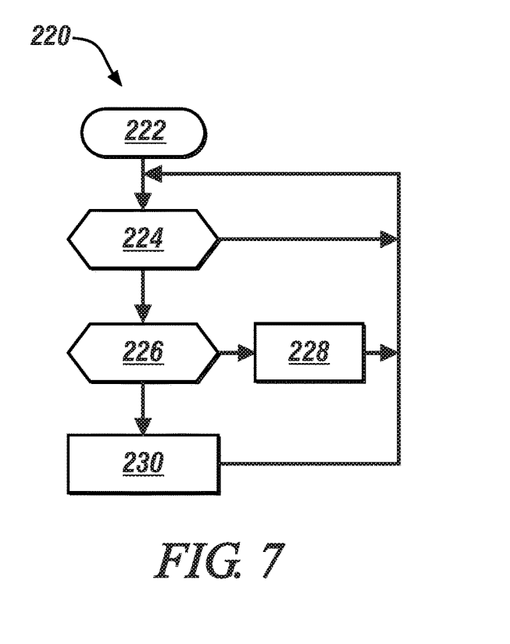
FIG. 7 is a flow diagram of a method for depressurizing the fuel lines in accordance with an exemplary embodiment.

Referring to FIG. 7, a flow diagram of an example method 220 for depressurizing the fuel lines is shown in accordance with an exemplary embodiment. The method (or process) 220 may be implemented by the pressure-based latching switch 100 and optionally by the controller 84. The method 220 generally comprises a step 222, a decision step 224, a decision step 226, a step 228 and a step 230. Other step orders may be implemented to meet the criteria of a particular application.

The method 220 generally starts in the step 222 when the shuttle valve 108 changes between the first fuel tank 70a and the second fuel tank 70b. Consider a case where the first fuel tank 70a is almost empty and the second fuel tank 70b has been switched to the fuel cell system 82. The method 220 may also be applied where the second fuel tank 70b is almost empty and the first fuel tank 70a has been switched to the fuel cell system 82.

Upon changing to the second fuel tank 70b, cold fuel from the first fuel tank 70a may be trapped between the first valve 106a and the shuttle valve 108. As the cold fuel warms, the pressure generally increases in the fuel line connected to the first port A. If the second port B of the shuttle valve 108 is closed, the third valve 112a may remain closed and the method 222 continues to monitor the conditions of the second port B. Once the second port B is open, the method 222 may monitor the pressure at the second port B in the decision step 226. If the pressure at the second port B is below the switch point pressure per the decision step 226, the third valve 112a may remain closed per the step 228. After the pressure rises above the switch point pressure, the third valve 112a may be opened in the step 230 to depressurize the trapped fuel away from the first port A of the shuttle valve 108. The method 220 may return to the decision step 224. If the pressure at the second port B subsequently falls below the switch point pressure per the decision step 226, the third valve 112a may be closed in the step 228 in anticipation of fuel being provided again from the first fuel tank 70a through the first valve 106a.

Figure 8:
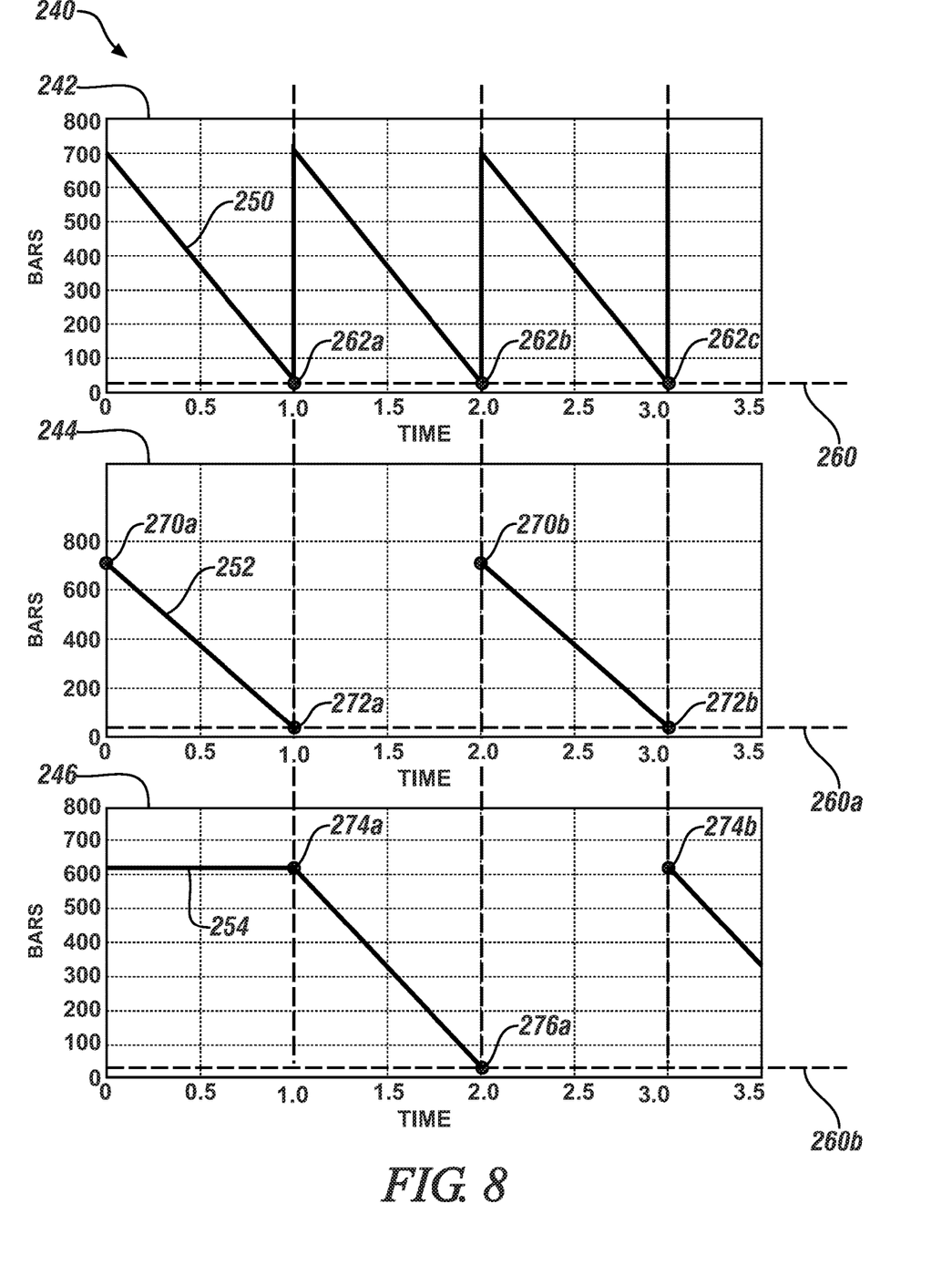
FIG. 8 is a graph of pressures over time with both fuel tanks available in accordance with an exemplary embodiment.

Referring to FIG. 8, a graph 240 of example pressures over time with both fuel tanks available is shown in accordance with an exemplary embodiment. The graph 240 is used to explain a case where both fuel tanks 70a and 70b are filled and connected to the power generator 80. The graph 240 generally comprises a subgraph 242, a subgraph 244 and a subgraph 246. The y-axes of the subgraphs 242, 244 and 246 may indicate a pressure in units of bars. The x-axes of the subgraphs 242, 244 and 246 may indicate time, where "1" unit of time indicates the time used to consume the fuel from one of the fuel tanks 70a-70b.

The subgraph 242 may illustrate the output pressure 250 of the fuel being presented from the pressure-based latching switch 100 to the gas handling unit 94. The subgraph 244 may illustrate the first tank pressure 252 of the fuel received by the pressure-based latching switch 100 from the first fuel tank 70a. The subgraph 246 may illustrate the second tank pressure 254 of the fuel received by the pressure-based latching switch 100 from the second fuel tank 70b.

The output pressure 250 presented by the pressure-based latching switch 100 generally starts at a full pressure level (e.g., approximately 700 bars), and decreases over time until the switch point pressure 260 is reached at a time 262a. The time 262a may be one unit of time provided by the current fuel tank 70a-70b (e.g., the first fuel tank 70a). Subgraph 244 generally shows the same decrease in the first tank pressure 252 from the first fuel tank 70a. The first tank pressure 252 may begin at the full pressure at an initial time 270a and decrease to the switch point pressure (e.g., the first switch point pressure 260a) at the time 272a. Subgraph 246 show that the second tank pressure 254 from the second fuel tank 70b may remain constant until the time 274a when the pressure-based latching switch 100 changes the fuel tanks 70a to 70b. Before the time 274a, the fuel cell system 82 may not consume any fuel from the second fuel tank 70b.

When the output pressure 250 presented by the pressure-based latching switch 100 reaches the switch point pressure 260, the pressure-based latching switch 100 may change from the first fuel tank 70a to the second fuel tank 70b, and so the output pressure 250 returns to the full pressure. The output pressure 250 may decrease again over time until a second time 262b when the output pressure 250 again reaches the switch point pressure 260. At the time 262b, the pressure-based latching switch 100 may change from the second fuel tank 70b to a newly-filled first fuel tank 70a. Subgraph 244 does not show the first tank pressure 252 between the times 272a and 270b as the first fuel tank 70a is being replaced or refilled. Subgraph 246 generally shows that the second tank pressure 254 from the second fuel tank 70b decreases from the time 274a until a time 276a. At the time 276a, the second tank pressure 254 from the second fuel tank 70b may reach the switch point pressure (e.g., the second switch point pressure 260b).

With the second fuel tank 70b running low, the pressure-based latching switch 100 may change from the second fuel tank 70b to the first fuel tank 70a and so the output pressure 250 increases again at the time 262b. The first tank pressure 252 from the first fuel tank 70a may decline from the time 270b until a time 272b. The second tank pressure 254 from the second fuel tank 70b is not shown between the time 276a and a time 274b because the second fuel tank 70b is being replaced or refilled.

In situations where the first fuel tank 70a and the second fuel tank 70b are similar, the switch point pressure 260 may match the first switch point pressure 260a and the second switch point pressure 260b. In situations where the first fuel tank 70a and the second fuel tank 70b are dissimilar, the first switch point pressure 260a may be different from the second switch point pressure 260b. For example, if a minimum (or lowest) amount of pressure allowed in the first fuel tank 70a is higher than the minimum (or lowest) amount of pressure allowed in the second fuel tank 70b, the first switch point pressure 260a may be higher than the second switch point pressure 260b.

Figure 9:
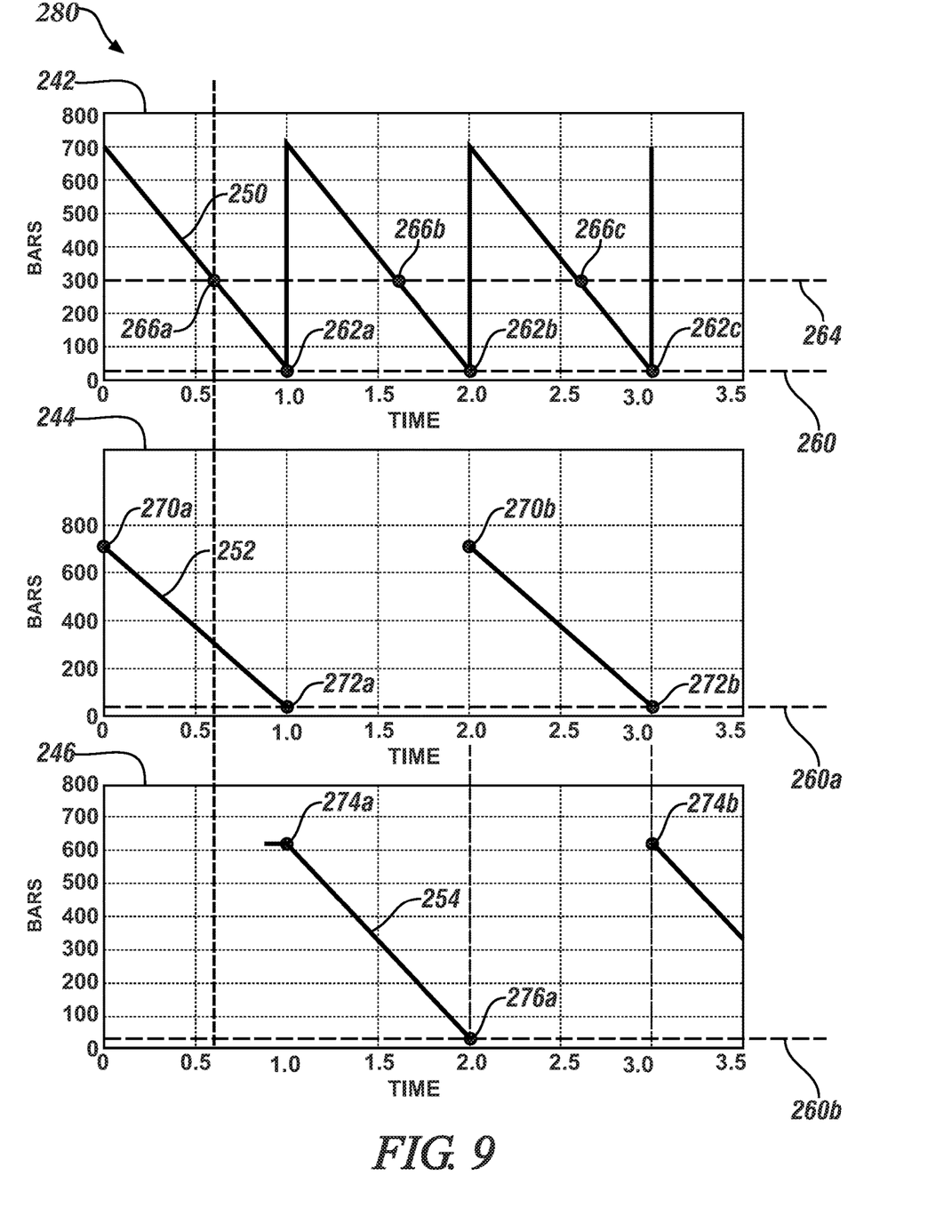
FIG. 9 is a graph of pressures over time with one fuel tank available in accordance with an exemplary embodiment.

Referring to FIG. 9, a graph 280 of example pressures over time with one fuel tank available is shown in accordance with an exemplary embodiment. The graph 280 is used to explain a case where the first fuel tank 70*a* is filled and connected to the power generator 80 and the second fuel tank 70*b* is not connected to the power generator 80 or is empty.

The output pressure 250 from the pressure-based latching switch 100 and the first tank pressure 252 from the first fuel tank 70*a* may start at the initial pressure (e.g., 700 bars) and decline as the fuel cell system 82 consumes the fuel. When the output pressure 250 reaches the first warning pressure 264, the controller 84 may generate the warning signal WRN at a time 266*a*. A duration between the time 266*a* when the warning signal WRN is asserted and the switch point pressure 260 is reached at the time 262*a* may be programmable in the controller 84. The duration is generally sufficient to bring the second fuel tank 70*b* from the refilling station to the location where the power generator 80 is located. The second fuel tank 70*b* may be connected to the power generator 80 before the time 262*a*.

When the output pressure 250 reaches the switch point pressure 260, the pressure-based latching switch 100 may switch the fuel supply from the first fuel tank 70*a* to the second fuel tank 70*b*. The second tank pressure 254 from the second fuel tank 70*b* may begin changing at the time 274*a* until the second fuel tank 70*b* has reached a minimal fuel pressure at the time 276*a*.

While the fuel cell system 82 is receiving fuel from the second fuel tank 70*b*, the output pressure 250 may again fall to the first warning pressure 264 at a time 266*b*. In response, the controller 84 may assert the warning signal WRN again to inform the operator that another fuel tank should be brought to the power generator 80. In some embodiments, the warning signal WRN may include a countdown clock until an automatic safe shutdown of the fuel cell system 82 may begin. When the output pressure 250 reaches the switch point pressure at the time 262*b*, the pressure-based latching switch 100 may change from the second fuel tank 70*b* to the recently arrived first fuel tank 70*a*. The process of exchanging fuel tanks 70*a*-70*b* may be repeated over and over to keep fuel flowing to the fuel cell system 82.

Figure 10:
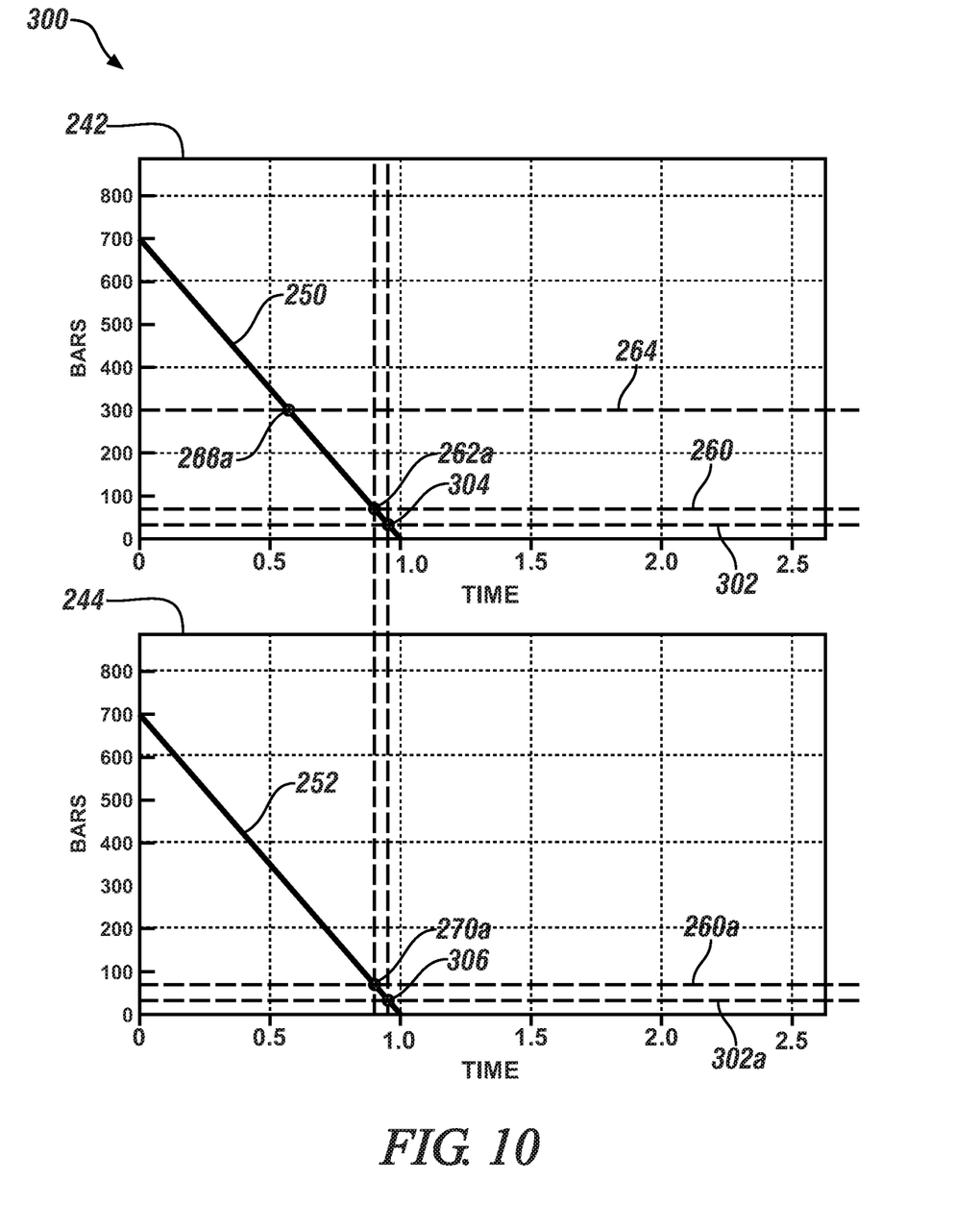
FIG. 10 is a graph of pressures over time with no replacement fuel tank available in accordance with an exemplary embodiment.

Referring to FIG. 10, a graph 300 of example pressures over time with no replacement fuel tank available is shown in accordance with an exemplary embodiment. The graph 300 is used to explain a case where the first fuel tank 70*a* is filled and connected to the power generator 80 and the second fuel tank 70*b* is not available or is empty when the first fuel tank 70*a* is depleted.

At the time 266*a*, the controller 84 may issue the warning signal WRN that another fuel tank should be connected to the power generator 80. In the current case, no additional fuel is brought to the power generator 80, so the output pressure 250 may continue to drop. At the switch point pressure 260, the pressure-based latching switch 100 may not disconnect the first fuel tank 70*a* because no fuel pressure is available at the second port B of the shuttle valve 108. Therefore, the output pressure 250 may continue to decline as the fuel cell system 82 consumes the fuel.

The output pressure 250 may reach a second warning pressure 302 at a time 304. Likewise, the first tank pressure 252 of the fuel from the first fuel tank 70*a* may reach a similar second warning pressure 302*a* around a similar time 306. In some situations, the second warning pressure 302*a* of the first fuel tank 70*a* may match the second warning pressure 302 of the fuel cell system 82. In other situations, the second warning pressure 302*a* of the first fuel tank 70*a* may be higher than the second warning pressure 302 of the fuel cell system 82 if the minimum pressure of the first fuel tank 70*a* does not provide for the lower pressure of the second warning pressure 302.

The second warning pressure 302,302*a* and/or the countdown timer presented in the warning signal WRN may be programmed into the controller 84 to provide adequate fuel for the fuel cell system 82 to perform a safe automatic shutdown. At the shutdown time 304/306 and/or expiration of the countdown time (whichever occurs first), the controller 84 may instruct the fuel cell system 82 to shut down.

Embodiments of the disclosure generally provide a technique that allow automatic fuel source switching based on one or more pressure set points (or levels). When a first source of the fuel (e.g., the first fuel tank) is reaching a low pressure level, to allow continuous operation, a second source of the fuel (e.g., the second fuel tank) may be plugged into a corresponding receptacle and the pressure-based latching switch 100 may coordinate, based on the fuel pressure, and switch of the shuttle valve 108 to the fuel source with the higher pressure. Another set of valves (e.g., valves 112*a*-112*b*) may compensate for eventual temperature rise of the cold fuel left within the fuel lines of the pressure-based latching switch 100. The compensation may allow the higher pressure line to be selected avoiding unwanted pressure oscillation at the pressure-based latching switch 100.

The technique may maximize fuel usage in a current mobile trailer prior to switching to an alternative mobile trailer, thereby optimizing manpower and equipment. Since the pressure-based latching switch 100 may switch between the fuel tanks automatically, the pressure-based latching switch 100 generally allows more flexibility on refueling scheduling. For example, the pressure-based latching switch 100 may swap fuel tanks in the middle of the night, in the middle of a storm and/or when road conditions make it difficult to bring another mobile trailer to the power generator. The continuous source of fuel generally increases trailer hardware protection while ensuring that the operational pressure may be above a minimum (or smallest) allowable trailer pressure. The automatic operation of the pressure-based latching switch may also reduce risks and limiting human error. Furthermore, the pressure-based latching switch may optimize hydrogen fuel utilization by allowing the fuel tanks to be utilized to operate at a lower pressure level of hydrogen.

While the best modes for carrying out the disclosure have been described in detail, those familiar with the art to which this disclosure relates will recognize various alternative designs and embodiments for practicing the disclosure within the scope of the appended claims.

What is claimed is:

1. A pressure-based latching switch comprising:
   a shuttle valve connectable to a fuel cell system, wherein the shuttle valve has a first port configured to receive a fuel from a first fuel tank, has a second port configured to receive the fuel from a second fuel tank, and is configured to switch the fuel supplied to the fuel cell system through one of the first port and the second port in response to a greater pressure of the fuel at the first port or the second port;
   a first valve in communication with the shuttle valve, and configured to switch the fuel from the first fuel tank to the first port of the shuttle valve while a second pressure of the fuel at the second port of the shuttle valve is less than a second threshold pressure;
   a second valve in communication with the shuttle valve, and configured to switch the fuel from the second fuel tank to the second port of the shuttle valve while a first pressure of the fuel at the first port of the shuttle valve is less than a first threshold pressure; and wherein the pressure-based latching switch changes the fuel supplied to the fuel cell system automatically from the first fuel tank to the second fuel tank in response to the first pressure of the fuel from the first fuel tank falling below the first threshold pressure.

2. The pressure-based latching switch according to claim 1, wherein the fuel comprises compressed hydrogen, the first fuel tank comprises a first hydrogen tank that is portable, and the second fuel tank comprises a second hydrogen tank that is portable.

3. The pressure-based latching switch according to claim 1, wherein the pressure-based latching switch further changes the fuel supplied to the fuel cell system automatically from the second fuel tank to the first fuel tank in response to the second pressure of the fuel falling below the second threshold pressure.

4. The pressure-based latching switch according to claim 1, wherein the fuel is further supplied continuously to the fuel cell system while at least one of:
the first fuel tank is connected to the pressure-based latching switch and is pressurized to a first minimum pressure greater than the first threshold pressure; and
the second fuel tank is connected to the pressure-based latching switch and is pressurized to a second minimum pressure greater than the second threshold pressure.

5. The pressure-based latching switch according to claim 1, further comprising:
a third valve configured to depressurize the fuel at the first port of the shuttle valve in response to the second pressure at the second port of the shuttle valve rising above a third threshold pressure; and
a fourth valve configured to depressurize the fuel at the second port of the shuttle valve in response to the first pressure at the first port of the shuttle valve rising above a fourth threshold pressure, wherein the third threshold pressure is different than the fourth threshold pressure.

6. The pressure-based latching switch according to claim 1, wherein:
the first threshold pressure is based on a first technology of the first fuel tank;
the second threshold pressure is based on a second technology of the second fuel tank; and
the first threshold pressure is different than the second threshold pressure.

7. The pressure-based latching switch according to claim 6, wherein the first threshold pressure is less than a minimum pressure of the fuel from the first fuel tank suitable to safely shut down the fuel cell system.

8. The pressure-based latching switch according to claim 1, further comprising a controller configured to generate a warning message in response to an output pressure of the fuel supplied to the fuel cell system falling below a first warning pressure.

9. The pressure-based latching switch according to claim 1, wherein the fuel cell system converts the fuel into electricity suitable to recharge a vehicle.

10. A method for pressure-based latching switching, comprising:
switching a fuel from a first fuel tank to a first port of a shuttle valve while a second pressure of the fuel at a second port of the shuttle valve is less than a second threshold pressure;
switching the fuel from a second fuel tank to the second port of the shuttle valve while a first pressure of the fuel at the first port of the shuttle valve is less than a first threshold pressure;
switching the fuel supplied to a fuel cell system through one of the first port of the shuttle valve and the second port of the shuttle valve in response to a greater pressure of the fuel at the first port or the second port; and
changing the fuel supplied to the fuel cell system automatically from the first fuel tank to the second fuel tank in response to the first pressure of the fuel falling below the first threshold pressure.

11. The method according to claim 10, wherein the fuel comprises compressed hydrogen, the first fuel tank comprises a first hydrogen tank that is portable, and the second fuel tank comprises a second hydrogen tank that is portable.

12. The method according to claim 10, further comprising:
changing the fuel supplied to the fuel cell system automatically from the second fuel tank to the first fuel tank in response to the second pressure of the fuel falling below the second threshold pressure.

13. The method according to claim 10, wherein the fuel is further supplied continuously to the fuel cell system while at least one of:
the first fuel tank is connected to the shuttle valve and is pressurized to a first minimum pressure greater than the first threshold pressure; and
the second fuel tank is connected to the pressure-based latching switch and is pressurized to a second minimum pressure greater than the second threshold pressure.

14. The method according to claim 10, further comprising:
depressurizing the fuel at the first port of the shuttle valve in response to the second pressure at the second port of the shuttle valve rising above a third threshold pressure; and
depressurizing the fuel at the second port of the shuttle valve in response to the first pressure at the first port of the shuttle valve rising above a fourth threshold pressure, wherein the third threshold pressure is different than the fourth threshold pressure.

15. A mobile power generator comprising:
a fuel cell system configured to convert a fuel into electricity suitable to recharge a vehicle;
a pressure-based latching switch connectable to a first fuel tank, connectable to a second fuel tank, in communication with the fuel cell system, and comprising a shuttle valve having a first port and a second port, wherein the pressure-based latching switch is configured to:
switch the fuel from the first fuel tank to the first port of the shuttle valve while a second pressure of the fuel at the second port of the shuttle valve is less than a second threshold pressure;
switch the fuel from the second fuel tank to the second port of the shuttle valve while a first pressure of the fuel at the first port of the shuttle valve is less than a first threshold pressure;
switch the fuel supplied to the fuel cell system through one of the first port of the shuttle valve and the second port of the shuttle valve in response to a greater pressure of the fuel at the first port or the second port; and
change the fuel supplied to the fuel cell system automatically from the first fuel tank to the second fuel tank in response to the first pressure of the fuel falling below the first threshold pressure; and a controller configured to generate a message in response to an output pressure of the fuel supplied to the fuel cell system falling below a first warning pressure.

16. The mobile power generator according to claim 15, wherein the fuel comprises compressed hydrogen, the first fuel tank comprises a first hydrogen tank that is portable, and the second fuel tank comprises a second hydrogen tank that is portable.

17. The mobile power generator according to claim 16, wherein:

the message is a time remaining until the fuel supplied from the first mobile trailer to the fuel cell system reaches a second warning pressure; and the time remaining is sufficient to provide another hydrogen source before the second warning pressure is reached.

18. The mobile power generator according to claim 15, wherein the pressure-based latching switch is further configured to:

depressurize the fuel at the first port of the shuttle valve in response to the second pressure at the second port of the shuttle valve rising above a third threshold pressure; and depressurize the fuel at the second port of the shuttle valve in response to the first pressure at the first port of the shuttle valve rising above a fourth threshold pressure, wherein the third threshold pressure is different than the fourth threshold pressure.

19. The mobile power generator according to claim 15, wherein the controller is further configured to initiate an automatic shutdown of the fuel cell system in response to the output pressure of the fuel supplied to the fuel cell system falling below a second warning pressure, and the second warning pressure is greater than the first threshold pressure.

20. The mobile power generator according to claim 15, wherein the fuel is provided continuously to the fuel cell system.

* * * * *